United States Patent [19]
Skipper

[11] 3,747,911
[45] July 24, 1973

[54] CIRCLE METAL CUTTER
[75] Inventor: Claud T. Skipper, Houston, Tex.
[73] Assignee: Productive Instruments & Machine, Inc., Houston, Tex.
[22] Filed: Aug. 19, 1971
[21] Appl. No.: 173,135

[52] U.S. Cl. ........... 266/23 M, 266/23 L, 266/23 N
[51] Int. Cl. ............................................. B23k 7/04
[58] Field of Search ............... 266/23 R, 23 F, 23 K, 266/23 L, 23 M, 23 N; 33/DIG. 1, 27 C, 27 D; 74/89, 89.16, 89.17, 815, 821, 822

[56] References Cited
UNITED STATES PATENTS

| 2,886,305 | 5/1959 | Strahan | 266/23 K |
|---|---|---|---|
| 2,424,286 | 7/1947 | Robbins | 266/23 M |
| 2,017,429 | 10/1935 | Anderson | 266/23 F |
| 985,978 | 3/1911 | Coxhead | 33/27 C |
| 1,759,288 | 5/1930 | Temple | 266/23 K |
| 1,176,584 | 3/1916 | Madgett | 33/27 C |
| 2,142,436 | 1/1939 | Clabeaux | 266/23 L |
| 2,866,631 | 12/1958 | Cink | 266/23 L |

FOREIGN PATENTS OR APPLICATIONS

| 201,483 | 11/1908 | Germany | 266/23 L |

Primary Examiner—Gerald A. Dost
Attorney—Murray Robinson et al.

[57] ABSTRACT

The circle metal cutter comprises a radial arm mounted on a centering block which has been centered on the circle to be cut in the metal work piece, an acetylene torch mounted on the end of the radial arm, and a motor mounted on the radial arm to pivot the radial arm on the centering block and about the center of the circle to be cut. The motor includes an actuating cylinder and a dampening cylinder each having a piston with a piston rod attached to a rack which engages a stationary pinion mounted on the centering block whereby upon the reciprocation of the rack the radial arm will rotate about the centering block thereby permitting the torch to cut a circle in the metal work piece. The actuating cylinder powers the rotation of the radial arm by a hydraulic force against the piston. The dampening cylinder regulates the velocity of the radial arm by incorporating a needle valve in the piston which regulates the flow of a fluid in the dampening cylinder thereby creating resistance to the movement of the piston in the actuating cylinder. The source of fluid for the actuating cylinder and the torch comes from a common source.

23 Claims, 6 Drawing Figures

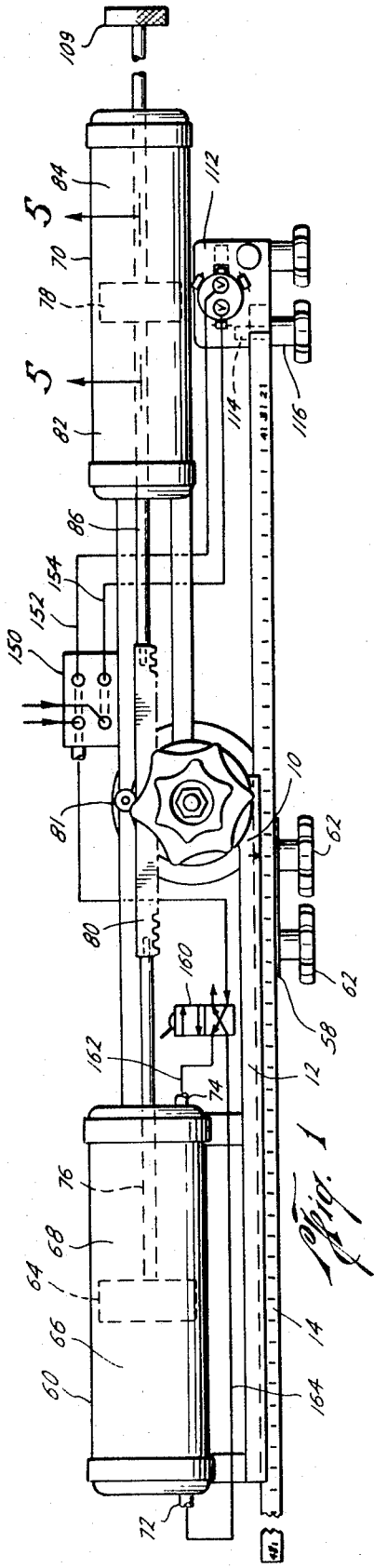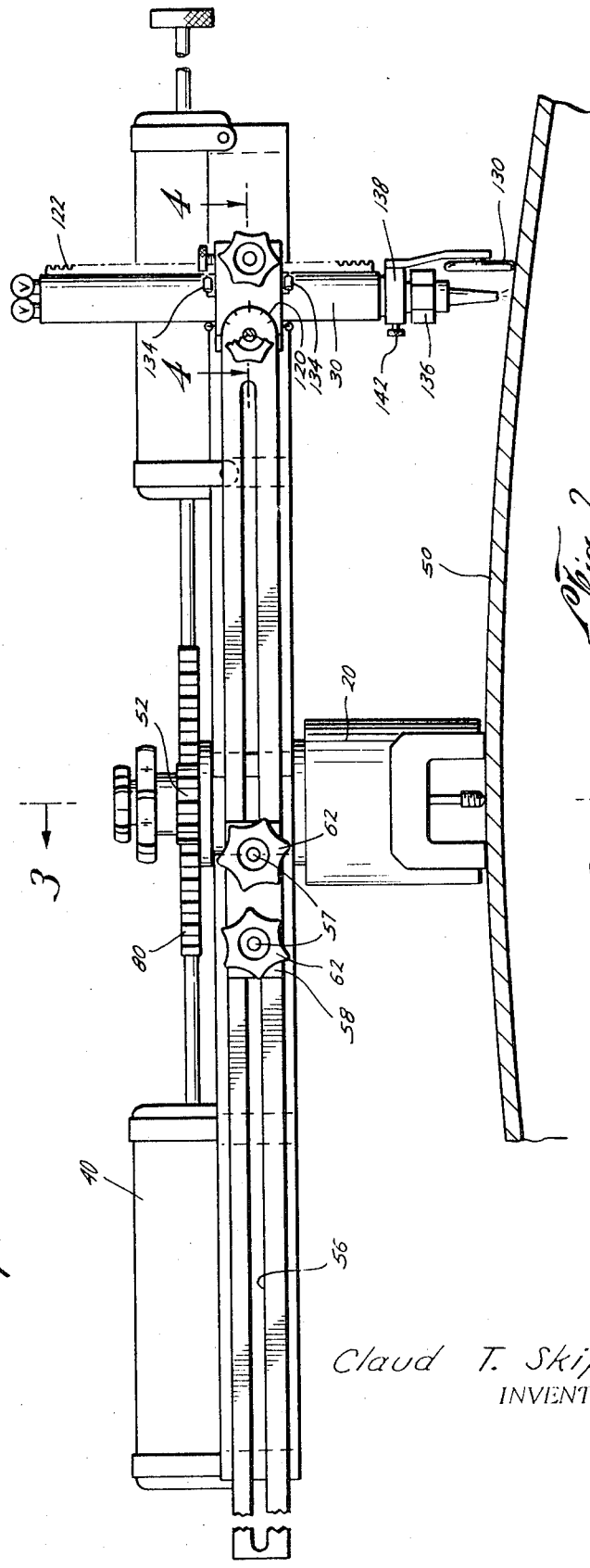

Claud T. Skipper
INVENTOR.

CIRCLE METAL CUTTER

BACKGROUND OF THE INVENTION

1. Field of the Invention

This invention pertains to the cutting of metals utilizing an acetylene torch, and more particularly to a mechanized apparatus which will cut a circle in metal plates.

2. Description of the Prior Art

It is known to combine a radial arm with a cutting torch releasably attached to one end of the arm and with a pivotal rod adjustably attached to the other end and the pivot rod having a point which is centered on the circle to be cut in the metal work piece with a magnet affixing the pivotal rod to the metal. Also, it is known to use a support wheel secured to the torch head to support the cutting torch as it is pivoted on the radial arm about the pivot rod. This has been shown in Lamb - U.S. Pat. No. 2,852,245. Miner - U.S. Pat. No. 2,483,294 also teaches this combination without the use of a magnet to affix the pointer to the metal work piece. However, Miner does show the use of a pivotal connection between the radial arm and the torch such that a bevel cut can be made in the metal plate. The use of a magnet to attach a pointer to the work piece has also been described by Kohlhafer - U.S. Pat. No. 2,363,007. The use of a pointer has been taught in Gilson - U.S. Pat. No. 2,548,302. The difficulty with these references is that the devices described must be manually operated whereas in the present invention the operation is fully mechanized.

Clark - U.S. Pat. No. 3,123,657 describes a computerized device for making curvature cuts in metal. However, this device is extremely complex, although it does describe the use of a rack and pinion in the movement of the mounted cutting torch. Maxon - U.S. Pat. No. 3,306,597 displays the mounting of a cutting torch on a carrier with a mechanized indexing device. However, the carrier itself does not pivot but the work piece rotates, with the cutting torch only reciprocating on the carrier. Both of these devices are extremely complex in comparison with the present invention.

It is also known to attach a rack to a hydraulic cylinder engaging a pinion and then rotate the pinion which is connected to another member. Herr - U.S. Pat. No. Re.24,883 displays a feeder mechanism wherein the device is controlled by a hydraulic cylinder having a piston attached to a rack engaging a pinion. Thompson - U.S. Pat. No. 3,085,452 displays the use of a hydraulic cylinder having a piston with a piston rod connected to a rack engaging a pinion turning a work table to index the work piece in accordance with the particular machining operations involved. Thompson also describes the use of a needle valve to regulate the speed of the movement of the piston in the hydraulic cylinder. Neither of these devices concerns the use of a metal cutting torch.

The prior art is deficient in the use of an automatic mechanized apparatus which is simple in design to make a circular cut in sheet metal. The references either describe a manual device or one requiring manual control, or the device is very complex and has to be very costly to use for such a simple operation. Although it is known to use the hydraulic cylinder as an actuating device, there is no showing that it has been used to automate a circle torch cutter.

SUMMARY OF THE INVENTION

The present invention provides a radial arm having a cutting torch mounted on one end and a centering block on the other end with the centering block being centered in the circle to be cut in the sheet metal. However, the present invention includes a motor mounted on the radial arm to mechanically rotate the radial arm about the centering block so as to cut a circle in the metal plate at a regulated speed to make a proper cut in the metal plate. The present invention distinguishes the prior art in that the pinion is fixed to the centering block and the rack rotates about the centering block and the pinion is stationary.

The motor mounted on the radial arm is hydraulically operated having an actuating cylinder and a dampening cylinder. The actuating cylinder has a piston with a piston rod attached to the rack rotating about the pinion and the dampening cylinder having a piston with a piston rod attached to the other end of the rack. The actuating cylinder provides the power for the motor with the dampening cylinder acting as dashpot piston for the regulation of the speed of rotation about the centering block. The speed is regulated by mounting a needle valve in the piston in the dampening cylinder whereby the flow of fluid from the two expansible chambers, created by the piston in the dampening cylinder, creating a resistance against the movement of the piston in the corresponding actuating cylinder. This flow is regulated by a valve stem connected to the needle valve extending through one end of the dampening cylinder whereby the rotation of this valve stem regulates the size of the port in the needle valve thereby regulating the resistance placed upon the piston rod in the actuating cylinder.

The present invention is portable because oxygen is used in the actuating cylinder and in the cutting torch and is supplied from the same source. This requires no outside source of energy other than the oxygen tank which is necessary to operate the cutting torch anyway.

The cutting torch is so mounted on the end of the radial arm that it can be used on metal sheets having a varied curvature. The cutting torch passes through a mount pivotally attached to the end of the radial arm. A rack is attached to the longitudinal side of the cutting torch with a corresponding pinion rotatably mounted in the mount whereby the cutting torch can reciprocate within the mount. A follower wheel is attached to the cutting torch head whereby the cutting torch can reciprocate within the mount according to the response of the follower wheel to the curvature of the metal sheet. The reciprocation of the cutting torch can be inhibited by a biasing spring placed against the shaft rotating the pinion thereby tempering the reciprocation of the cutting torch within the mounting block.

Having the mounting block pivotally mounted to the cutting torch permits the apparatus to make bevel cuts in the metal sheet. The radial arm has a longitudinal slot with guide pins mounted in the frame whereby many different radii of cuts can be made by adjusting the slot in these guide pins.

In the preferred embodiment a permanent magnet is inserted in the centering block to affix the pointer to the metal sheet. The pointer has a threaded end such that the apparatus can also be used upside down by welding a nut to the center of the circle tube cut in the metal sheet and threading the pointer into the nut thereby suspending the apparatus in the upside down position to make the circular cut in the metal sheet.

Other objects and advantages of the invention will appear from the following description.

BRIEF DESCRIPTION OF THE DRAWINGS

For a detailed description of a preferred embodiment of the invention, reference will now be made to the accompanying drawings wherein:

FIG. 1 is a top view of a circle metal cutter;

FIG. 2 is a side view of the circle metal cutter;

DESCRIPTION OF THE PREFERRED EMBODIMENT

Figure 3:
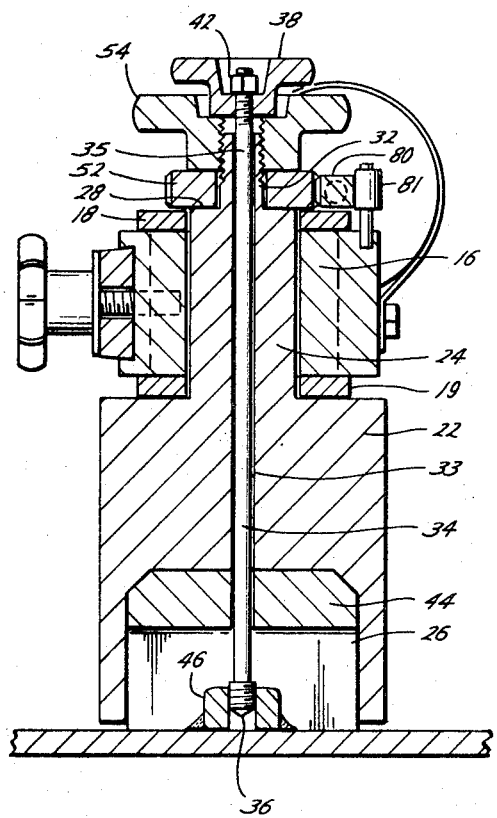
FIG. 3 is a sectional view of the centering block and radial arm taken at plane 3—3 indicated in FIG. 2.
Figure 4:
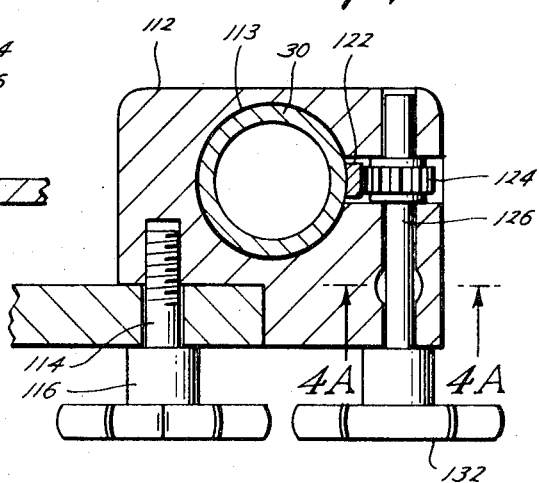
FIG. 4 is a sectional view of the mounting block taken at plane 4—4 indicated in FIG. 2.

The present invention, depicted by FIGS. 1 and 2, provides an apparatus for making circular cuts in metal plates or sheet metal. The apparatus generally includes a radial arm 10 rotatably mounted on a centering block 20 with a cutting torch 30 mounted on the end of the radial arm 10. The centering block 20 is attached to the metal work piece 50 with the axis of rotation of the radial arm 10 coinciding with the center of the circle to be cut in the workpiece 50. A hydraulic motor 40 is mounted on the radial ram 10 to provide mechanized means of rotating the radial arm 10 about the centering block 20. As the radial arm rotates on the centering block 20, the torch makes a circular cut in the work piece 50.

The centering block 20, as shown in FIG. 3, includes a cylindrical metal block 22 having a spindle 24 centered on one end of the cylindrcal block 22 and and a recess in the other end of the cylindrical block 22 at 26. The spindle 24 has upwardly facing shoulders 28 at its upper end creating a spindle extension 32. The cylindrical block 22, the spindle 24, and the spindle extension 32 have a common bore 33 through their center through which pointer 34 may pass. Pointer 34 is a rod 35 having a point 36 on one end and a knob 38 attached to the other end by passing the rod 35 through the knob 38 and threading it to a nut 42.

The pointer 34 permits an accurate alignment of the centering block 20 with the center of the circle to be cut. The pointer 34 passes through the bore 33 of the spindle extension 32 allowing the pointer 34 to be adjusted vertically to facilitate lining the point 36 with the center of the circle.

The centering block 20 is anchored to the metal work piece 50 in the preferred embodiment by means of a permanent magnet 44. However, since the permanent magnet is not strong enough to attach the assembly to a metal work piece when the cutting must be done with the apparatus in an upside down position, another method of attachment is required such as is shown in FIG. 3. FIG. 3 shows the alternative method of welding a nut 46 to the center of the circle to be cut and threading the pointed end 36 of the pointer 34 into the nut 46 thereby supporting the apparatus in the upside down position.

The radial arm 10 includes a frame 12 and an adjustable extension bar 14 as shown in FIGS. 1 and 2. Frame 12 has a sleeve 16 shown in FIG. 3 rotatably mounted on spindle 24 between upper and lower thrust washers 18, 19. The upwardly facing shoulder 28 supports a pinion 52. The pinion 52 is held stationary by knob 54 threaded on spindle extension 32.

Extension bar 14 is adjustable permitting the cutting of circles of different radii. The extension bar 14 is made adjustable by having a longitudinal slot 56 through which two guide pins 57 protrude attaching to the frame 12. A plate 58 with corresponding holes matching guide pins 57 capture extension bar 14 between the frame 12 and plate 58 with knobs 62 being threaded on guide pins 57 securing the extension bar 14 to the frame 12. By loosning knobs 62, the extension bar 14 may be adjusted by sliding the extension bar 14 on the guide pins to adjust the length of the extension bar 14.

A mount 112 is pivotally secured to the end of extension bar 14 by a shaft 114 protruding from mount 112 and passing through the end of extension bar 14 threading into a knob 116. The mount 112 has a circular bore 113 therethrough permitting the passage of a cutting torch 30 having a cylindrical outer casing so that the cutting torch 30 slides within the bore 113. A plurality of guide rollers 134 attached to the upper and lower sides of mount 112 facilitating the reciprocation of the cutting torch 30 within the circular bore 113. A rack 122 is attached longitudinally to the side of the cutting torch 30. A pinion 124 is rotatably mounted on a shaft 126 within mount 112 with one end of shaft 126 extending through mount 112 and threading into a knob 132. The pinion 124 engages the rack 122 whereby upon rotation of the knob 132 the pinion 124 reciprocates the rack 122 thereby adjusting the vertical height of the cutting torch 30 above the work piece 50. This allows the adjustment of the flame height between the cutting head 136 and the work piece 50 to permit the proper adjustment for cutting work pieces of different thicknesses.

A follower wheel 130 is connected to the head 136 of the cutting torch 30 by means of an arm extending from a collar 138 which circumscribes the cutting head 136. A set screw 142 is threaded into the collar 138 thereby securing the collar to the head 136 by biasing the screw against the head 136. The follower wheel 130 gives added support to the weight of the radial arm 10 and the cutting torch 30.

Figure 4A:
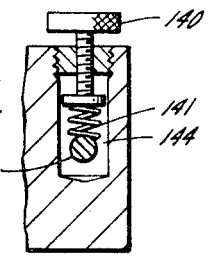
FIG. 4A is sectional view of a biasing spring taken at plane 4A—4A indicated in FIG. 4.

The follower wheel 130 permits the invention to be used when the curvature of the surface of the metal work piece 50 has a varied topography such as shown in FIG. 2. The follower wheel 130 responds to the surface curvature of the work piece 50 thereby reciprocating the cutting torch 30 to the proper cutting level. A bias screw 140 shown in FIG. 4A is threaded into a bore 144 in the top of the mount 112 thereby cooperating with shaft 126 rotating pinion 124. A spring 141 is biased between the end of the biasing screw 140 and the rod 126 so that a tension can be placed on rod 126 thereby restricting the ease with which the cutting torch 30 can reciprocate within the mount 112. Biasing screw 140 permits the operator to put a set amount of tension on rod 126 and, therefore, on the reciprocation of the cutting torch 30 by restricting the rotation of pinion 124.

Bevel cuts can be made by cutting torch 30 in the work piece 50 by pivoting mount 112 on shaft 114 attached to mount 112. The end of extension bar 14 is graduated permitting a certain angular cut in the work piece 50 as indicated at 120 on bar 14.

The motor 40 is secured to the frame 12 and includes an actuating cylinder 60 and a dampening cylinder 70 whereby the actuating cylinder 60 provides the power to rotate the radial arm 10 and the dampening cylinder 70 provides means to adjust the speed of the rotation.

The actuating cylinder 60 includes a piston 64 creating expansible chambers 66 and 68 each having a fluid opening 72, 74 disposed at the ends of the cylinder 60. A piston rod 76 is attached to the center of the piston 64 and extends through the center of one end of the cylinder 60 attaching to a rack 80. Rack 80 engages pinion 52 and is held in position by a follower roller 81 secured to sleeve 16. The reciprocation of rack 80 causes radial arm 10 to rotate. Pinion 52 is secured to shoulders 28 on centering block 20 by means of knob 54 and is thereby stationary. The force of rack 80 against pinion 52 causes radial arm 10, upon which the motor 40 and rack 80 are mounted, to rotate.

The dampening cylinder 70 includes a piston 78 creating expansible chambers 82 and 84. Piston 78 has a piston rod 86 attached to its center with the opposite end of the piston rod 86 connected to the other end of rack 80. A nonflammable fluid such as antifreeze liquid is placed in cylinder 70.

Figure 5:
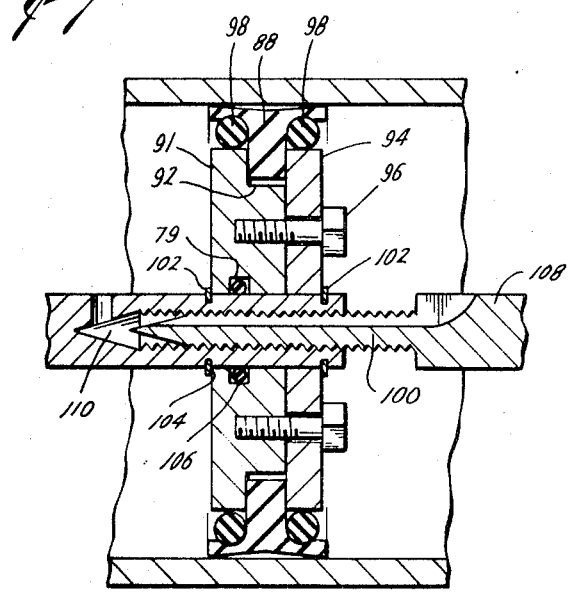
FIG. 5 is a sectional view of a needle valve taken at plane 5—5 indicated in FIG. 1.

Piston 78, as shown in FIG. 5, includes a circular metal disk 91 having a shoulder 92 around its periphery. An annular sealing member 88 having a cross-section generally in the form of a "T" is inserted in the shoulder. The sealing member 88 is secured to the piston by a circular plate 94 attached to disk 91 by means of cap screws 96. Annular sealing rings 98 are placed between the sealing member 88 and the peripheral edges of the disk 78 and the plate 94 thereby providing a fluid seal between chambers 82 and 84.

A needle valve 100 passes through a bore 104 in the center of the piston 78 and is secured by means of split rings 102. An annular groove 79 in disk 91 around the internal periphery of the bore 104 includes an O-ring 106 to seal the needle valve 100 to the piston 78. A valve stem 108 is attached to the needle valve 100 to adjust the size of the port 110 thereby controlling the flow of fluid from one chamber to the other chamber. The valve stem 108 passes through the end opposite the piston rod 86 and is threaded into a knob 109. The rotation of knob 109 varies the size of the port 110 in needle valve 100 thereby regulating the flow of fluid from one chamber to another. This flow of fluid through needle valve 100 provides resistance to the movement of the piston 64 in the actuating cylinder 60 and thereby controls the speed of the movement of the rack 80 thereby regulating the rotation speed of the radial arm 10. The dampening cylinder 70 acts as a dashpot piston.

The preferred embodiment displays the use of an acetylene torch as the cutting torch 30. Oxygen and acetylene are supplied to the cutting torch 30 from a manifold 150 via flexible hoses 152 and 154. Oxygen is used to power the actuating cylinder 64 in the preferred embodiment and is also supplied by the manifold 150. The oxygen from the manifold 150 supplied to the actuating cylinder 66 passes through a three-way valve 160. Hoses 162 and 164 are respectively attached to openings 72 and 74 in the ends of the actuating cylinder 60. Therefore, to rotate radial arm 10 in the clockwise direction three-way valve 160 permits the oxygen to pass through hose 164 and into chamber 66 thereby placing pressure against piston 64 and collapsing chamber 68. The speed of the movement of piston 64 is controlled by the needle valve 100 in piston 78 such that the fluid flow from chamber 84 to chamber 82 is dampening cylinder 70 controls the amount of resistance to the movement of piston 64 in cylinder 60. Fluid hose 162 becomes a bleed line and permits the oxygen in chamber 68 to escape to the atmosphere. To rotate the radial arm 10 in the counter clockwise direction, line 162 becomes connected to the oxygen supply by valve 160 and line 164 becomes the bleed line as the piston 64 collapses chamber 66.

While a preferred embodiment of the invention has been shown and described modifications thereof can be made by one skilled in the art without departing from the spirit of the invention.

I claim:

1. An apparatus for cutting circles in metal comprising,
   support means,
   a frame rotatably mounted on said support means,
   a cutting instrument mounted on said frame,
   centering means for centering the axis of rotation of said frame at the center of the circle to be cut in said metal,
   motor means for driving said frame about said axis of rotation, said motor means being mounted on said frame,
   a pinion secured to said support means, and
   a rack attached to said motor means, said rack engaging said pinion, said motor means reciprocating said rack and said rack applying force to said pinion causing said frame, cutting instrument, motor means, and rack to rotate about said centering means.

2. An apparatus according to claim 1 wherein said cutting instrument includes means for cutting said metal powered by a type of energy, and said motor means including means to rotate said frame powered by the same type of energy utilized by said cutting means.

3. An apparatus according to claim 2 wherein said cutting instrument is reciprocably mounted on said frame, said instrument having a wheel attached to roll along the surface of said metal.

4. An apparatus according to claim 3 wherein said centering means includes means for attaching said apparatus to the underside of said metal.

5. An apparatus for cutting circles in metal comprising support means,
   a frame rotatably mounted on said support means,
   an instrument mounted on said frame,
   means for centering the axis of rotation of said frame at the center of the circle to be cut in said metal,
   motor means for driving said frame about said axis of rotation, said motor means being mounted on said support means,
   said cutting instrument including means for cutting said metal powered by a type of energy, said motor means including means to drive said frame powered by the same type energy used by said cutting means,
   a pinion secured to said centering means, and a rack mounted to said motor means, said rack engaging said pinion, said motor means reciprocating said rack, and said rack applying force to said stationary pinion causing said frame, cutting instrument, motor means and rack to rotate about said centering means, said cutting instrument being reciprocably mounted on said frame, said instrument having a wheel attached to roll along the surface of said metal, and said centering means including means for attaching said apparatus to the underside of said metal.

6. An apparatus according to claim 1 wherein said centering means incldes a pointer, a cylindrical metal member having a spindle on one end and a recess in the other end, said metal member and spindle having a common bore through their center through which said pointer may pass, and a permanent magnet affixed within said recess to affix said centering means to said metal plate.

7. An apparatus for the cutting of circles in metal plates comprising,
   a radial arm,
   a cutting torch mounted on one end of said radial arm,
   means for centering the axis of rotation of said radial arm at the center of said circle on said metal plate,
   a motor for rotating said radial arm about said center of said circle, and
   said centering means including a pointer having its point coinciding with the center of said circle, a cylindrical metal member having a spindle on one end and a recess in the other end, said metal member and spindle having a common bore through their center through which said pointer may pass, and a nut fixed to the center of said circle of said metal plate to which the end of said pointer may be releasably attached.

8. An apparatus according to claim 6 further including means for adjusting the vertical height of said pointer, said pointer including a metal rod having a point on one end.

9. An apparatus according to claim 1 wherein said support means includes a cylindrical metal member having a spindle on one end, said centering means includes a pointer, said metal member and spindle having a common bore through their center through which said pointer may pass, and said frame includes an adjustable extension member, said frame having a collar rotatably mounted about said spindle, said extension member having a longitudinal slot, and said frame having two guide pins protruding through said slot permitting the cutting of circles with different radii in said metal plate.

10. An apparatus according to claim 9 wherein said cutting head is attached to one end of said extension member, said cutting head including an acetylene torch and a mount, said mount having a circular bore therethrough and said torch having a cylindrical outer casing reciprocably mounted within said circular bore of said mount, and said torch having a rack affixed to said outer casing and said mount having a rotatable pinion engaging said rack whereby said torch can be reciprocated within said mount.

11. An apparatus according to claim 10 wherein a wheel is attached to said cutting head to roll along the surface of said metal sheet thereby forcing said cutting torch to reciprocate as the wheel responds to the topography of the metal sheet maintaining the cutting distance between the cutting head and metal sheet.

12. An apparatus for the cutting of circles in metal plates comprising,
   a radial arm,
   a cutting instrument mounted on one end of said radial arm,
   means for centering the axis of rotation of said radial arm at the center of said circle on said metal plate,
   rotation means for rotating said radial arm about said center of said circle,
   said rotation means including an actuating cylinder for providing the power to rotate said radial arm and a dampening cylinder for adjusting the speed of rotation of said radial arm.

13. An apparatus according to claim 12 wherein said dampening cylinder includes a piston creating two expansible chambers, said piston having a rod protruding from its center through one end of said dampening cylinder, said dampening cylinder being substantially filled with a second fluid, said piston having an adjustable needle valve permitting said second fluid to flow from one chamber to the other, said needle valve being adjustable by a valve stem passing through the end of said dampening cyinder opposite the rod whereby upon rotating said valve stem the needle valve will vary the flow of the second fluid from one chamber to the other.

14. An apparatus according to claim 13 wherein said actuating cylinder includes a piston creating two expansible chambers, said piston having a rod projecting from its center through a hole in one end of said actuating cylinder, said actuating cylinder having two openings one at each end for the passage of a fluid supplied by said source of power whereby a fluid pressure is created at one opening thereby forcing the piston to move toward the opposite end of said cylinder and said other opening acting as an exit for said escaping fluid.

15. An apparatus according to claim 14 wherein said rod protruding from said actuating cylinder is attached to one end of a rack and said rod protruding from said dampening cylinder is attached to the other end of said rack, a pinion being affixed to said centering means engaging the teeth of said rack, said rack also being attached to said radial arm whereby the flow of fluid in said actuating cylinder causes said rack to reciprocate thereby rotating said radial arm about said centering means so as to cut a circle in said metal plate.

16. An apparatus according to claim 14 wherein said actuating cylinder includes a three-way valve whereby fluid pressure may be applied to either chamber of said actuating cylinder with the opening in the other chamber acting as an exit for said fluid in that chamber.

17. An apparatus according to claim 16, said cutting torch being actuated by a type of energy, and said actuating cylinder being driven by the same type of energy.

18. An apparatus for performing an operation with respect to a material comprising:
   positioning means;
   a frame rotatably mounted on said positioning means;
   an instrument mounted on said frame for performing an operation with respect to said material;
   a pinion secured to said positioning means;
   a rack adapted for engagement with said pinion; and
   motor means for driving said rack causing said frame to move about said positioning means, said motor means being mounted on said frame.

19. An apparatus according to claim 18 wherein said positioning means includes support means for supporting said frame, and centering means for centering the axis of rotation of said frame with respect to said material.

20. An apparatus for performing an operation with respect to a material comprising:
positioning means;
a radial arm mounted on said positioning means;
an instrument mounted on said radial arm for performing an operation with respect to said material; and
movement means for moving said radial arm with respect to said positioning means; said movement means including a first piston and cylinder means for powering said movement means, and a second piston and cylinder means for adjusting the speed of the movement of said radial arm, said first piston and cylinder means being connected to said second piston and cylinder means.

21. An apparatus according to claim 20 wherein said second piston and cylinder means includes a piston and a cylinder, said piston having an adjustable needle valve for restricting the flow of a fluid in said cylinder.

22. An apparatus according to claim 20 wherein said first piston and cylinder means has a member connected to said second piston and cylinder means.

23. A motor for pivoting a frame about a pivotal member comprising:
a member;
engagement means on said member adapted for engaging said pivotal member;
actuation means on said member for moving said member relative to said pivotal member; and
dampening means on said member for dampening the movement of said member relative to said pivotal member.

* * * * *